(12) United States Patent
Nishiguchi et al.

(10) Patent No.: US 11,299,160 B2
(45) Date of Patent: Apr. 12, 2022

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Haruhiko Nishiguchi, Wako (JP); Satoshi Fujii, Wako (JP); Hiroyuki Koibuchi, Wako (JP); Idhsada Sanguanwongthong, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 647 days.

(21) Appl. No.: 16/215,741

(22) Filed: Dec. 11, 2018

(65) Prior Publication Data

US 2019/0176832 A1    Jun. 13, 2019

(30) Foreign Application Priority Data

Dec. 13, 2017    (JP) .............................. JP2017-239085

(51) Int. Cl.
*B60W 30/18*    (2012.01)
*B60W 10/20*    (2006.01)
(Continued)

(52) U.S. Cl.
CPC ...... *B60W 30/18163* (2013.01); *B60W 10/04* (2013.01); *B60W 10/18* (2013.01);
(Continued)

(58) Field of Classification Search
CPC .......... B60W 30/18163; B60W 10/20; B60W 10/18; B60W 10/04; B60W 10/30;
(Continued)

(56) References Cited

U.S. PATENT DOCUMENTS 8,666,599 B2 * 3/2014 Otuka ................... G08G 1/167
701/41
10,131,356 B2 * 11/2018 Takae .................. G05D 1/0088
(Continued)

FOREIGN PATENT DOCUMENTS

CN    105711587    6/2017
CN    106809215    6/2017
(Continued)

OTHER PUBLICATIONS

Japanese Office Action for Japanese Patent Application No. 2017-239085 dated Jul. 2, 2019.
(Continued)

*Primary Examiner* — Fadey S. Jabr
*Assistant Examiner* — Mohamed Abdo Algehaim
(74) *Attorney, Agent, or Firm* — Amin, Turocy & Watson, LLP

(57) ABSTRACT

A vehicle control device (100, 1) including: a detector (110, 16) detecting other vehicles; a lane change executer (154) executing a lane change of a subject vehicle on the basis of states of the other vehicles detected by the detector without depending on a steering operation of a vehicle occupant of the subject vehicle; a determiner (152) determining whether or not the lane change is to be continued on the basis of the states of the other vehicles executing a lane change from a third lane adjacent to a second lane to the second lane, which are being detected or have been detected by the detector, after control of executing a lane change of the subject vehicle from a first lane to the second lane adjacent to the first lane is started by the lane change executer; and a return controller (156) returning the subject vehicle from the second lane to the first lane in a case in which it is determined that the lane change is not to be continued by the determiner.

7 Claims, 10 Drawing Sheets

(51) Int. Cl.
*B60W 10/18* (2012.01)
*B60W 10/04* (2006.01)
*B60W 10/30* (2006.01)
*B60W 30/12* (2020.01)

(52) U.S. Cl.
CPC ............ *B60W 10/20* (2013.01); *B60W 10/30* (2013.01); *B60W 30/12* (2013.01); *B60W 2554/00* (2020.02); *B60W 2710/06* (2013.01); *B60W 2710/18* (2013.01); *B60W 2710/20* (2013.01); *B60W 2710/30* (2013.01)

(58) Field of Classification Search
CPC ......... B60W 2554/00; B60W 2710/30; B60W 2710/18; B60W 2710/20; B60W 2710/06; B60W 30/12; B60W 2554/4045; B60W 2554/80; B60W 30/18; B60W 40/04
USPC ............................................................ 701/41
See application file for complete search history.

(56) References Cited

U.S. PATENT DOCUMENTS

| | | | |
|---|---|---|---|
| 10,501,084 B2* | 12/2019 | Sugawara | G05D 1/0214 |
| 10,600,324 B2* | 3/2020 | Fujii | B60W 30/18163 |
| 10,663,971 B2* | 5/2020 | Sugawara | B60W 30/0956 |
| 11,173,912 B2* | 11/2021 | Yoo | B60W 50/0098 |
| 2012/0296522 A1* | 11/2012 | Otuka | B60W 30/12 701/41 |
| 2013/0184926 A1* | 7/2013 | Spero | B60W 30/18163 701/26 |
| 2015/0353082 A1* | 12/2015 | Lee | B60W 30/10 701/41 |
| 2016/0101785 A1* | 4/2016 | Takahashi | G06K 9/00791 701/31.4 |
| 2017/0080952 A1* | 3/2017 | Gupta | B60W 50/14 |
| 2017/0240176 A1* | 8/2017 | Aoki | G08G 1/167 |
| 2018/0037233 A1* | 2/2018 | Fendt | G05D 1/0088 |
| 2018/0188735 A1* | 7/2018 | Sugawara | G06K 9/00805 |
| 2018/0215387 A1* | 8/2018 | Takae | B60W 30/18163 |
| 2018/0268703 A1* | 9/2018 | Kang | G06K 9/00791 |
| 2018/0281791 A1* | 10/2018 | Fukaya | B60W 30/09 |
| 2019/0071079 A1* | 3/2019 | Nishiguchi | B60W 30/12 |
| 2019/0315358 A1* | 10/2019 | Kim | B60W 30/18163 |
| 2019/0382019 A1* | 12/2019 | Abe | G08G 1/167 |
| 2020/0094838 A1* | 3/2020 | Nishimura | G05D 1/0061 |
| 2020/0217685 A1* | 7/2020 | Koh | G06K 9/00798 |
| 2020/0269840 A1* | 8/2020 | Tsuji | B60W 50/087 |
| 2021/0123474 A1* | 4/2021 | Landrieve | G01D 5/26 |
| 2021/0163011 A1* | 6/2021 | Maru | G01C 21/3691 |

FOREIGN PATENT DOCUMENTS

| | | |
|---|---|---|
| CN | 107323450 | 11/2017 |
| JP | 2012-226392 | 11/2012 |
| JP | 2017-033045 | 2/2017 |
| JP | 2017-065420 | 4/2017 |
| WO | 2017/056726 | 4/2017 |

OTHER PUBLICATIONS

Chinese Office Action for Chinese Patent Application No. 201811514147.7 dated Sep. 7, 2021.

* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2017-239085 filed Dec. 13, 2017, the content of which is incorporated herein by reference.

BACKGROUND OF THE INVENTION

Field of the Invention

The present invention relates to a vehicle control device, a vehicle control method, and a storage medium.

Description of Related Art

Conventionally, a technology is known in which a lane change is suppressed when there is a vehicle that becomes an obstacle for the lane change in a target lane, and, after waiting until there is no vehicle that becomes an obstacle, the suppression of the lane change is released, and a lane change is executed (for example, see Unexamined Japanese Patent Application Publication No. 2012-226392).

SUMMARY OF THE INVENTION

However, in the conventional technology, occurrences of unexpected events in the process of executing a lane change are not sufficiently considered.

An aspect of the present invention is realized in consideration of such situations, and one object thereof is to provide a vehicle control device, a vehicle control method, and a storage medium capable of executing a lane change with other vehicles or other vehicle occupants taken into account.

A vehicle control device, a vehicle control method, and a storage medium according to the present invention employ the following configurations.

(1): A vehicle control device including: a detector detecting other vehicles; a lane change executer executing a lane change of a subject vehicle on the basis of states of the other vehicles detected by the detector without depending on a steering operation of a vehicle occupant of the subject vehicle; a determiner determining whether or not the lane change is to be continued on the basis of the states of the other vehicles executing a lane change from a third lane adjacent to a second lane to the second lane, which are being detected or have been detected by the detector, after control of executing a lane change of the subject vehicle from a first lane to the second lane adjacent to the first lane is started by the lane change executer; and a return controller returning the subject vehicle from the second lane to the first lane in a case in which it is determined that the lane change is not to be continued by the determiner.

(2): In the aspect (1) described above, the determiner determines whether or not the lane change is to be continued on the basis of a degree of entry of the subject vehicle into the second lane.

(3): In the aspect (2) described above, in a case in which the other vehicles executing the lane change from the third lane to the second lane have a predetermined positional relation with the subject vehicle, the determiner determines that the lane change is to be continued in a case in which a degree of entry of the subject vehicle into the second lane is higher than a criterion and determines that the lane change is not to be continued in a case in which the degree of entry of the subject vehicle into the second lane is lower than the criterion.

(4): In the aspect (3) described above, the determiner changes the criterion on the basis of an index value representing a degree of approach between the other vehicles executing the lane change from the third lane to the second lane and the subject vehicle.

(5): In the aspect (2) described above, the determiner determines that the lane change is not to be continued regardless of the degree of entry in a case in which the other vehicles executing the lane change from the third lane to the second lane enter a predetermined area on a lateral side of the subject vehicle.

(6): In the aspect (3) described above, the criterion is able to be changed by a vehicle occupant.

(7): In the aspect (1) described above, the determiner determines whether or not the lane change is to be continued on the basis of an index value representing a degree of approach between the other vehicles executing the lane change from the third lane to the second lane and the subject vehicle.

(8): In the aspect (1) described above, the determiner changes conditions for determining whether or not the lane change is to be continued on the basis of the degree of entry of the subject vehicle into the second lane.

(9): In the aspect (8) described above, the determiner changes the conditions for determining whether or not the lane change is to be continued to a side on which it is easy to continue the lane change as the degree of entry of the subject vehicle into the second lane becomes higher.

(10): A vehicle control method according to another aspect of the present invention is a vehicle control method executed using a computer mounted in a vehicle, the vehicle control method including: detecting other vehicles; executing a lane change of a subject vehicle on the basis of states of the other vehicles detected by a detector without depending on a steering operation of a vehicle occupant of the subject vehicle; determining whether or not the lane change is to be continued on the basis of the states of the other vehicles executing a lane change from a third lane adjacent to a second lane to the second lane after control of executing a lane change of the subject vehicle from a first lane to the second lane adjacent to the first lane is started; and returning the subject vehicle from the second lane to the first lane in a case in which it is determined that the lane change is not to be continued.

(11): A storage medium according to another aspect of the present invention is a computer-readable non-transitory storage medium storing a program, the program causing a computer to execute: detecting other vehicles; executing a lane change of a subject vehicle on the basis of states of the other vehicles detected by a detector without depending on a steering operation of a vehicle occupant of the subject vehicle; determining whether or not the lane change is to be continued on the basis of the states of the other vehicles executing a lane change from a third lane adjacent to a second lane to the second lane after control of executing a lane change of the subject vehicle from a first lane to the second lane adjacent to the first lane is started; and returning the subject vehicle from the second lane to the first lane in a case in which it is determined that the lane change is not to be continued.

According to the aspects (1) to 11, a lane change with other vehicles or a vehicle occupant taken into account can be executed.

DETAILED DESCRIPTION OF THE INVENTION

Hereinafter, a vehicle control device, a vehicle control method, and a program according to embodiments of the present invention will be described with reference to the drawings.

First Embodiment

[Entire Configuration]

Figure 1:
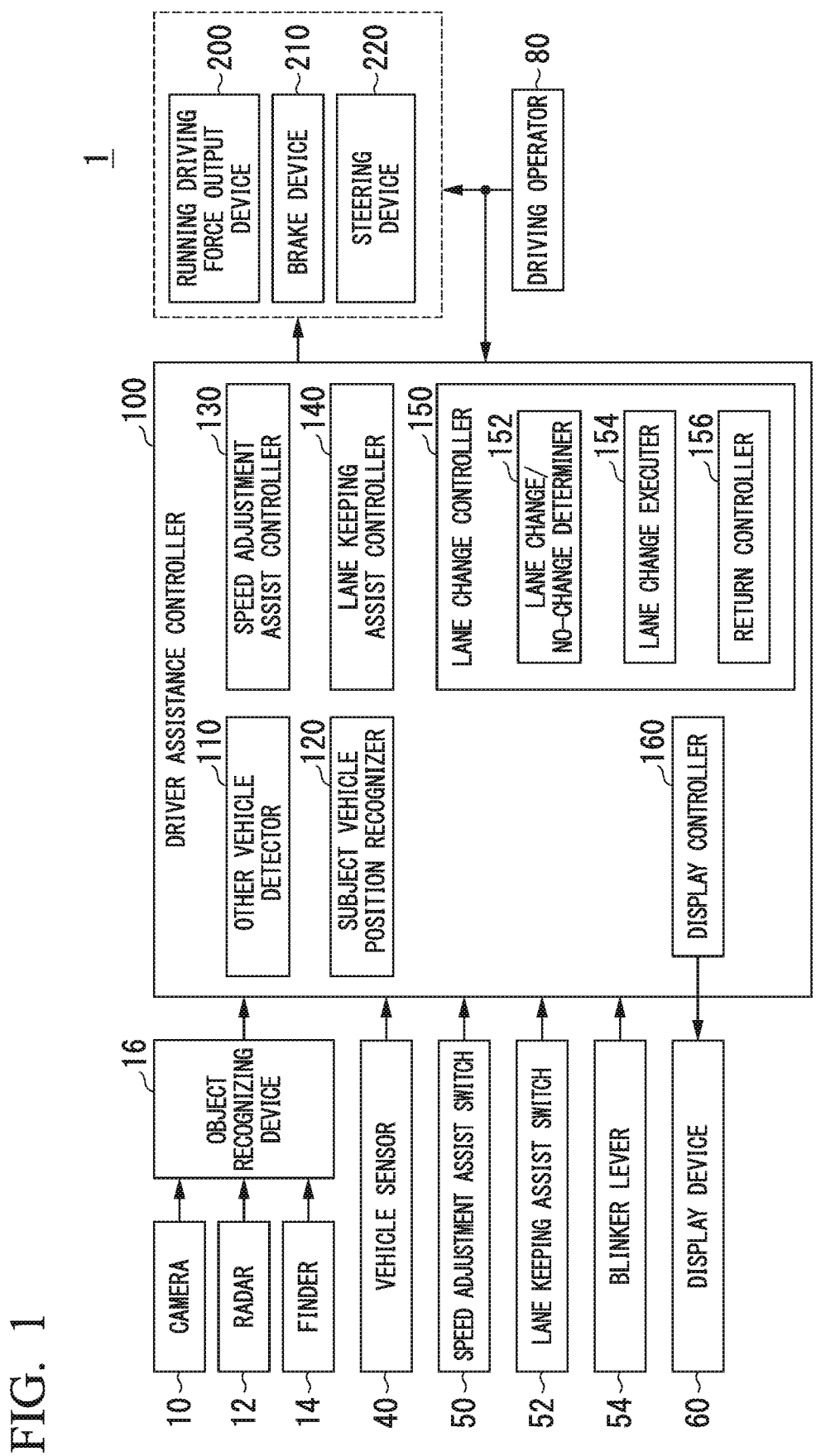
FIG. 1 is a configuration diagram of a vehicle system 1 using a vehicle control device according to a first embodiment.

FIG. 1 is a configuration diagram of a vehicle system 1 using a vehicle control device according to an embodiment. A vehicle in which the vehicle system 1 is mounted (hereinafter referred to as a subject vehicle M) is, for example, a vehicle having two wheels, three wheels, four wheels, or the like, and a driving source thereof is an internal combustion engine such as a diesel engine or a gasoline engine, an electric motor, or a combination thereof. The electric motor operates using power generated using a power generator connected to an internal combustion engine or discharge power of a secondary cell or a fuel cell.

The vehicle system 1, for example, includes a camera 10, a radar 12, a finder 14, an object recognizing device 16, a human-machine interface (HMI) 20, a vehicle sensor 40, a speed adjustment assist switch 50, a lane keeping assist switch 52, a blinker lever 54, a display device 60, a driving operator 80, a driver assistance controller 100, a running driving force output device 200, a brake device 210, and a steering device 220. Such devices and units are interconnected using a multiplex communication line such as a controller area network (CAN) communication line, a serial communication line, a radio communication network, or the like. The configuration illustrated in FIG. 1 is merely one example, and thus, a part of the configuration may be omitted, and, furthermore, other components may be added thereto. The driver assistance controller 100 is one example of a vehicle control device.

The camera 10, for example, is a digital camera using a solid-state imaging device such as a charge coupled device (CCD) or a complementary metal oxide semiconductor (CMOS). One or a plurality of cameras 10 are installed at arbitrary places on the subject vehicle M. In a case in which the side in front is to be imaged, the camera 10 is installed at an upper part of a front windshield, a rear face of a rear-view mirror, or the like. The camera 10, for example, repeatedly images the vicinity of the subject vehicle M periodically. The camera 10 may be a stereo camera.

The radar 12 emits radio waves such as millimeter waves to the vicinity of the subject vehicle M and detects at least a position of (a distance and an azimuth to) an object by detecting radio waves (reflected waves) reflected by the object. One or a plurality of radars 12 are installed at arbitrary places on the subject vehicle M. The radar 12 may detect a position and a speed of an object using a frequency modulated continuous wave (FM-CW) system.

The finder 14 employs light detecting and ranging or laser imaging detection and ranging (LIDAR) that detects a distance to a target by measuring scattering light for emission light. One or a plurality of finders 14 are mounted at arbitrary positions in the subject vehicle M.

The object recognizing device 16 may perform a sensor fusion process on results of detection using some or all of the camera 10, the radar 12, and the finder 14, thereby allowing recognition of a position, a type, a speed, a moving direction, and the like of an object. Objects to be recognized, for example, are objects of types such as a vehicle, a guard rail, a utility pole, pedestrians, and a road mark. The object recognizing device 16 outputs a result of the recognition to the driver assistance controller 100. The object recognizing device 16 may output a part of information input from the camera 10, the radar 12, or the finder 14 to the driver assistance controller 100 as it is.

The vehicle sensor 40, for example, includes a vehicle speed sensor that detects a speed of the subject vehicle M, an acceleration sensor that detects acceleration, a yaw rate sensor that detects an angular velocity around a vertical axis, an azimuth sensor that detects the azimuth of the subject vehicle M, and the like.

Each sensor included in the vehicle sensor 40 outputs detection signals representing detection results to the driver assistance controller 100.

The speed adjustment assist switch 50 is a switch used for instructing start of a speed adjustment assist operation. The lane keeping assist switch 52 is a switch used for instructing start of a lane keeping assist operation. Such switches may be either mechanical switches or graphical user interface (GUI) switches, in other words, operation areas disposed on a touch panel. The blinker lever 54 instructs an operation of a direction indicator and functions as a switch for instructing an automatic lane change in a predetermined case. The predetermined case, for example, is a case in which speed adjustment assist and lane keeping assist are operated. As a switch used for instructing an automatic lane change, a switch according to a different mode may be used.

The display device 60 is a display device such as a liquid crystal display (LCD) or an organic electroluminescence (EL) display. The display device 60, for example, is disposed between meters in a part of an instrument panel that frontally faces a driver. However, the display device 60 is not limited thereto but may be a head up display (HUD), may be disposed at a vehicle center part of the instrument panel, or may be a display device that is common to the navigation device.

The driving operator 80, for example, includes various operators such as the acceleration pedal, the brake pedal, the steering wheel, and the shift lever described above. In each driving operator 80, an operation detector that detects the amount of operation performed by a vehicle occupant or presence/absence of an operation is mounted. The operation detector detects the amount of depression of the acceleration pedal or the brake pedal, the position of the shift lever, a steering angle or a steering torque of a steering wheel, or the like. Then, the operation detector outputs a detection signal representing detection results to the driver assistance controller 100 or one or two of the running driving force output device 200, the brake device 210 and the steering device 220.

[Driver Assistance Controller (Vehicle Control Device)]

The driver assistance controller 100, for example, is realized by one or more processors. The driver assistance controller 100, for example, includes an other vehicle detector 110, a subject vehicle position recognizer 120, a speed adjustment assist controller 130, a lane keeping assist controller 140, a lane change controller 150, and a display controller 160. The lane change controller 150, for example, includes a lane change/no-change determiner 152, a lane change executer 154, and a return controller 156. Such constituent elements, for example, are realized by a hardware processor such as a central processing unit (CPU) executing a program (software). Some or all of such constituent elements may be realized by hardware (including circuitry) such as large scale integration (LSI), an application specific integrated circuit (ASIC), a field-programmable gate array (FPGA), or a graphic processing unit (GPU) or may be realized by cooperation between software and hardware.

Before description of the driver assistance controller 100, the running driving force output device 200, the brake device 210, and the steering device 220 will be described. The running driving force output device 200 outputs a running driving force (torque) for enabling the subject vehicle M to run to driving wheels. The running driving force output device 200, for example, includes a combination of an internal combustion engine, an electric motor, and a transmission, and a power electronic controller (ECU) controlling these. The power ECU controls the components described above in accordance with information input from the driver assistance controller 100 or information input from the driving operator 80.

The brake device 210, for example, includes a brake caliper, a cylinder that delivers hydraulic pressure to the brake caliper, an electric motor that generates hydraulic pressure in the cylinder, and a brake ECU. The brake ECU performs control of the electric motor in accordance with information input from the driver assistance controller 100 or information input from the driving operator 80 such that a brake torque according to a brake operation is output to each vehicle wheel. The brake device 210 may include a mechanism delivering hydraulic pressure generated in accordance with an operation on the brake pedal included in the driving operators 80 to the cylinder through a master cylinder as a backup. The brake device 210 is not limited to the configuration described above and may be an electronically-controlled hydraulic brake device that delivers hydraulic pressure in the master cylinder to a cylinder by controlling an actuator in accordance with information input from the driver assistance controller 100.

The steering device 220, for example, includes a steering ECU and an electric motor. The electric motor, for example, changes the direction of the steering wheel by applying a force to a rack and pinion mechanism. The steering ECU changes the direction of the steering wheel by driving an electric motor in accordance with information input from the driver assistance controller 100 or information input from the driving operator 80.

The other vehicle detector 110 recognizes states of other vehicles such as positions, speeds, accelerations, and the like on the basis of information input from the camera 10, the radar 12, and the finder 14 through the object recognizing device 16. A position of another vehicle may be represented as a representative point such as the center of gravity a corner, or the like of surrounding vehicles, or may be represented in an area represented by contours of surrounding vehicles. A "state" of another vehicle may include an acceleration, a jerk, or an "action state" (for example, whether or not the object is changing lanes or trying to change lanes) of a surrounding vehicle. By mounting a function corresponding to the other vehicle detector 110 in the object recognizing device 16, the driver assistance controller 100 may acquire information such as positions of other vehicles from the object recognizing device 16. In such a case, the other vehicle detector 110 may be omitted.

The subject vehicle position recognizer 120, for example, recognizes a lane in which the subject vehicle M runs (own lane) and a relative position and a posture of the subject vehicle M with respect to the own lane. The subject vehicle position recognizer 120, for example, recognizes road partition lines LM from an image captured using the camera 10 and recognizes a lane partitioned by two partition lines LM closest to the subject vehicle M among the recognized partition lines LM as its own lane. Then, the subject vehicle position recognizer 120 recognizes a position and a posture of the subject vehicle M with respect to the recognized own lane. In addition, the subject vehicle position recognizer 120 recognizes positions of an adjacent lane adjacent to the own lane, a lane adjacent to the adjacent lane, and the like.

For example, in a case in which another vehicle is present within a predetermined distance (for example, about 50 [m]) in front of the subject vehicle M among other vehicles detected by the other vehicle detector 110, the speed adjustment assist controller 130 performs control of the running driving force output device 200 and the brake device 210 such that the subject vehicle M follows the another vehicle (hereinafter, referred to as a preceding vehicle) with a constant inter-vehicle distance maintained therebetween. In a case in which another vehicle corresponding to a preceding vehicle is not present, the speed adjustment assist controller 130 performs control of the running driving force output device 200 and the brake device 210 such that a set vehicle speed set in advance is maintained.

The lane keeping assist controller 140 performs control of the steering device 220 such that the subject vehicle keeps the own lane recognized by the subject vehicle position recognizer 120. For example, the lane keeping assist controller 140 outputs a steering torque to the steering device 220 such that the subject vehicle M runs at the center of the own lane. The steering torque at this time, for example, is adjusted such that it becomes an assisting torque for an operation in a direction toward the center of the own lane and becomes a reaction torque for an operation in a direction away from the center of the own lane.

In a case in which the subject vehicle M runs at a position deviating to one of left and right sides from the center of the own lane, the lane keeping assist controller 140 performs lane deviation suppression control. For example, in a case in which the subject vehicle M is close to the partition line LM until a distance between the partition line LM partitioning the own lane and the subject vehicle M becomes a predetermined distance or less, the lane keeping assist controller 140 promotes attention of a vehicle occupant by vibrating the steering wheel. At this time, by displaying an image on various display devices or outputting sound or the like from a speaker, it can be notified to a vehicle occupant that the subject vehicle M may deviate from the own lane. After vibrating the steering wheel, in a case in which there is no vehicle occupant's operation on the steering wheel (in a case in which a steering angle or a steering torque is less than a threshold), the lane keeping assist controller 140 outputs a steering torque to the steering device 220 such that the direction of the steering wheel is changed to the center side of the own lane.

For example, in a case in which an instruction for execution of an automatic lane change (hereinafter, referred to as automated lane change (ALC)) is made by a vehicle occupant, the lane change controller 150 starts an operation. The instruction of the ALC, for example, is performed by an operation on the blinker lever 54. When the blinker level 54 is operated in one direction for a predetermined time or more, the lane change controller 150 executes an ALC toward a lane on the operated side. For example, the lane change controller 150 sets a condition that both the speed adjustment assist controller 130 and the lane keeping assist controller 140 are operating as a start condition for the ALC. The reason for this is that it is desirable to stably maintain the behavior of the vehicle at a start time point so as to realize a smooth ALC. As an operator for receiving a start instruction for starting an ALC, an operator other than the blinker lever 54 may be prepared.

The lane change/no-change determiner 152 determines whether or not a lane change to a lane on the side to which an ALC is instructed can be made. For example, when start conditions for starting an ALC such as conditions that an obstacle including another vehicle is not present in a lane that is a lane change destination, a partition line LM partitioning a lane that is a lane change destination and the own lane is not a road mark representing prohibition of a lane change (prohibition of protruding), a lane that is a lane change destination is recognized, the own lane is not a curved road, different driver assistance control having a priority level higher than the ALC is not performed, a predetermined time or more has elapsed from the start of operations of the speed adjustment assist controller 130 and the lane keeping assist controller 140, and the like are satisfied, the lane change/no-change determiner 152 causes the lane change executer 154 to start a process. Here, different driver assistance control having a priority level higher than the ALC, for example, is control of urgently avoiding an obstacle.

The lane change executer 154 changes lanes of the subject vehicle to an adjacent lane on the side instructed by a vehicle occupant by performing control of the running driving force output device 200, the brake device 210, and the steering device 220 without depending on a vehicle occupant's operation of the steering wheel (steering control). The lane change executer 154, for example, generates a target locus based on a spline curve or the like and performs control of the running driving force output device 200, the brake device 210, and the steering device 220 such that the subject vehicle passes through sampling points on the locus. While causing the speed to approach a desired speed pattern by controlling the running driving force output device 200 or the brake device 210, the lane change executer 154 may set time-series target values of a speed in a horizontal direction (lane width direction), a yaw rate, a turning angle, and the like and perform control of the steering device 220 such that they approach the target values. The desired speed pattern may be either a speed pattern in which the subject vehicle continuously runs at a constant speed or a speed pattern set such that the subject vehicle decelerates or accelerates in accordance with the advancement of a lane change.

Figure 2:
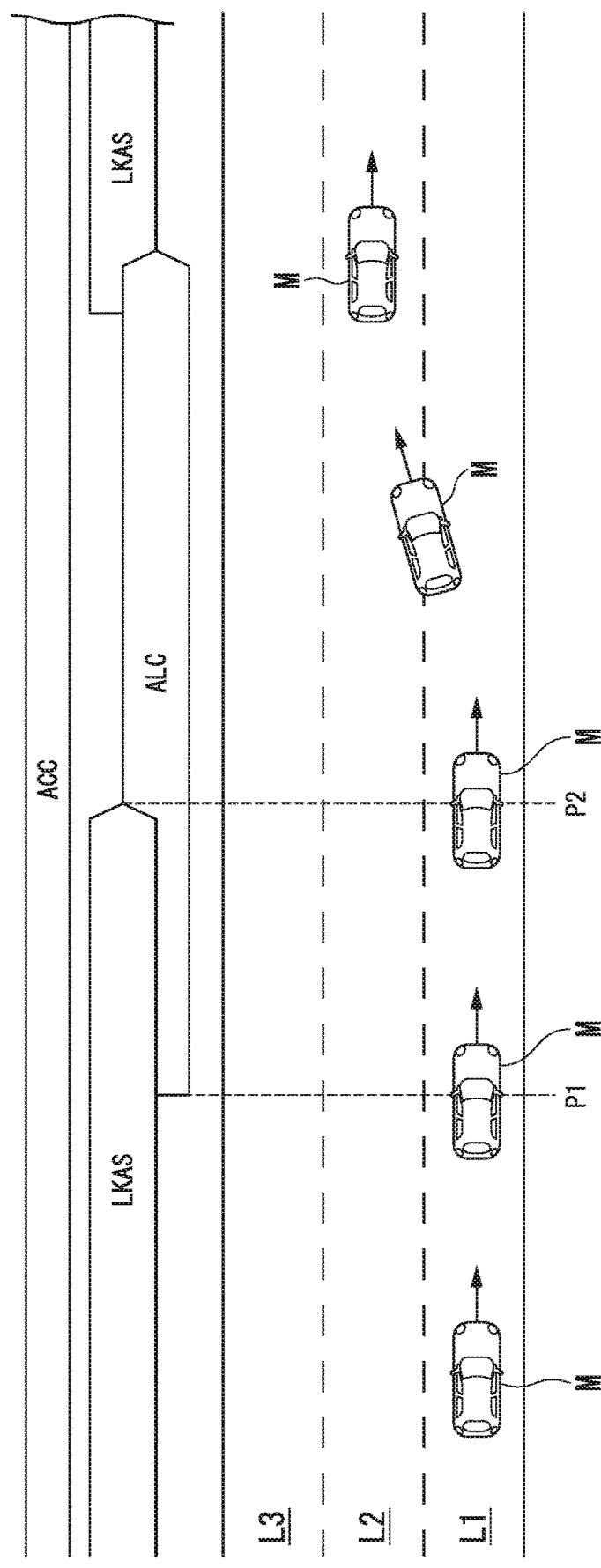
FIG. 2 is a diagram illustrating transitions of control until an automated lane change (ALC) is completed without any trouble.

Hereinafter, it is premised that the subject vehicle M changes lanes from a first lane L1 to a second lane L2, and there is a third lane L3 adjacent to the second lane L2 on a side opposite to the first line L1. FIG. 2 is a diagram illustrating transitions of control until an automatic lane change (ALC) is completed without any trouble. In the drawing, "ACC" represents control executed by the speed adjustment assist controller 130 as adaptive cruise control (ACC), and "LKAS" represents control executed by the lane keeping assist controller 140 as a lane keeping assist system (LKAS). Hereinafter, such representations will be appropriately used in description. In the example illustrated in FIG. 2, at a position P1, the blinker lever 54 is operated to the left side in a state in which both the speed adjustment assist controller 130 and the lane keeping assist controller 140 operate. At this time, the lane change/no-change determiner 152 of the lane change controller 150 starts to determine whether or not start conditions for starting an ALC are satisfied. Until the determination ends, the lane change/no-change determiner 152 only advances the determination process in the background, and the lane keeping assist controller 140 has the steering control. At a position P2, when it is determined that the execution start conditions for starting the ALC are satisfied, the steering control moves to the lane change controller 150. In this way, the ALC is executed by the lane change executer 154. When the ALC is completed, the steering control moves to the lane keeping assist controller 140 again.

Until the ALC is completed after the ALC is started, the lane change/no-change determiner 152 determines whether or not execution continuation conditions for the ALC are satisfied on the basis of the state of another vehicle changing lanes from the third lane L3 to the second lane L2 (hereinafter, referred to as specified other vehicle), which is detected (or has been detected) by the other vehicle detector 110 and determines whether or not the ALC is to be continued on the basis of a result of the determination. The execution continuation conditions for the ALC may be similarly applied to not only the specified other vehicle but also other vehicles originally running in the lane L2.

Figure 3:
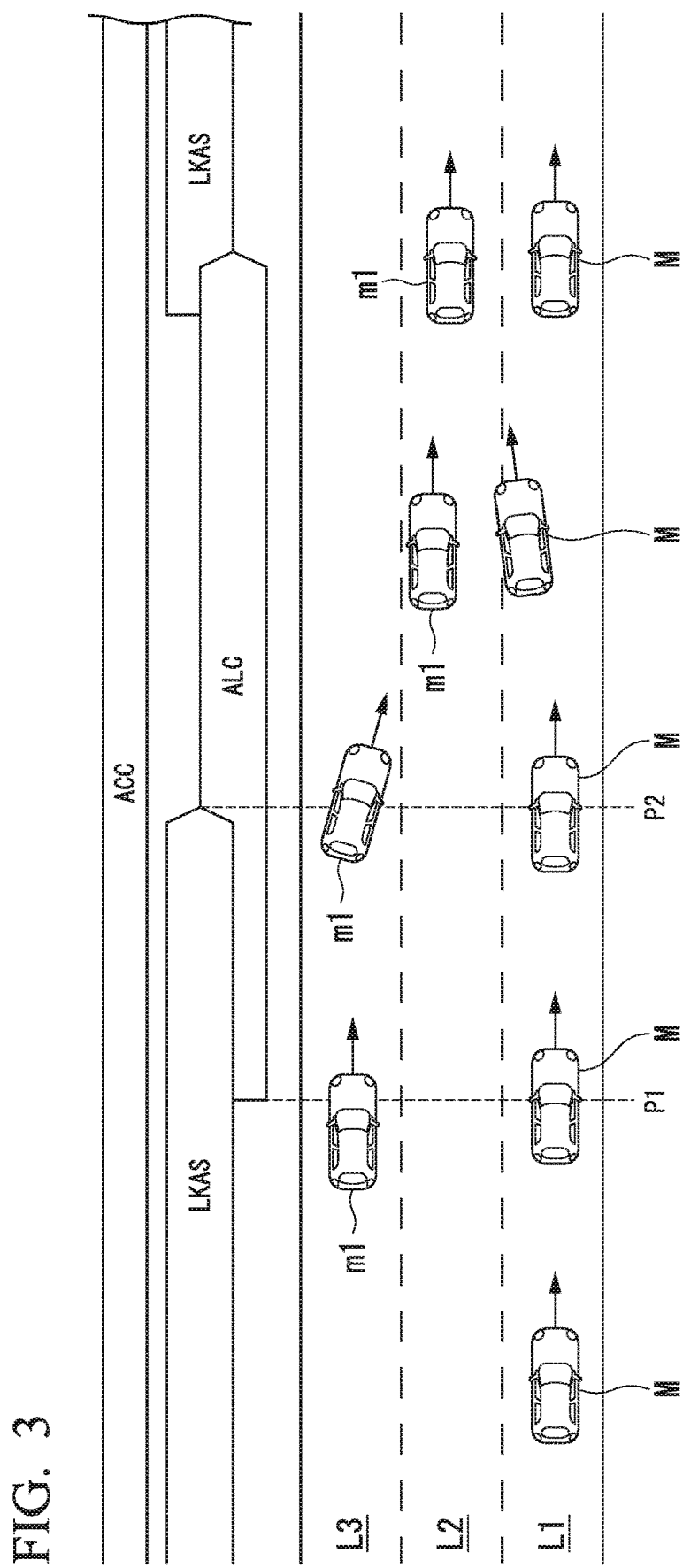
FIG. 3 is a diagram illustrating transitions of control until the ALC is stopped.

FIG. 3 is a diagram illustrating transitions of control until the ALC is stopped. In an example illustrated in FIG. 3, although it is determined that the execution start conditions for an ALC are satisfied at a position P2, thereafter, another vehicle changes lanes from the third lane L3 to the second lane L2 to be a specified other vehicle m1, and the execution continuation conditions of the ALC are determined not to be satisfied by the lane change/no-change determiner 152, whereby it is determined that the ALC is not to be continued. For this reason, the subject vehicle M does not move to the second lane L2 but is returned to the first lane L1 by the return controller 156.

The return controller 156 performs control of the running driving force output device 200, brake device 210, and the steering device 220 such that the subject vehicle M moves to the center of the first lane L1 that is the original lane (hereinafter, this will be referred to as "returning (or being returned) to the original lane"). The return controller 156, similar to the lane change executer 154, may generate a target locus based on a spline curve or the like and perform control of the running driving force output device 200, the brake device 210, and the steering device 220 such that the subject vehicle passes through a sampling point on the locus or may set time-series target values of a speed in the horizontal direction (the lane width direction), a yaw rate, a turning angle, and the like and perform control of the steering device 220 such that they approach the target values while causing the speed to approach a desired speed pattern.

The execution continuation conditions for an ALC, for example, are set in a stepped manner in accordance with the elapse of time after the blinker lever 54 is operated. For example, the execution continuation conditions for an ALC are different conditions in a first period before a first timing, in a second period after the first timing and before a second timing, and in a third period after the second timing. The execution continuation conditions for an ALC are set such that it is easiest for the subject vehicle to be returned to the original lane in the first period, and, thereafter, it is more difficult for the subject vehicle to be returned to the original lane in order of the second period and the third period.

Figure 4:
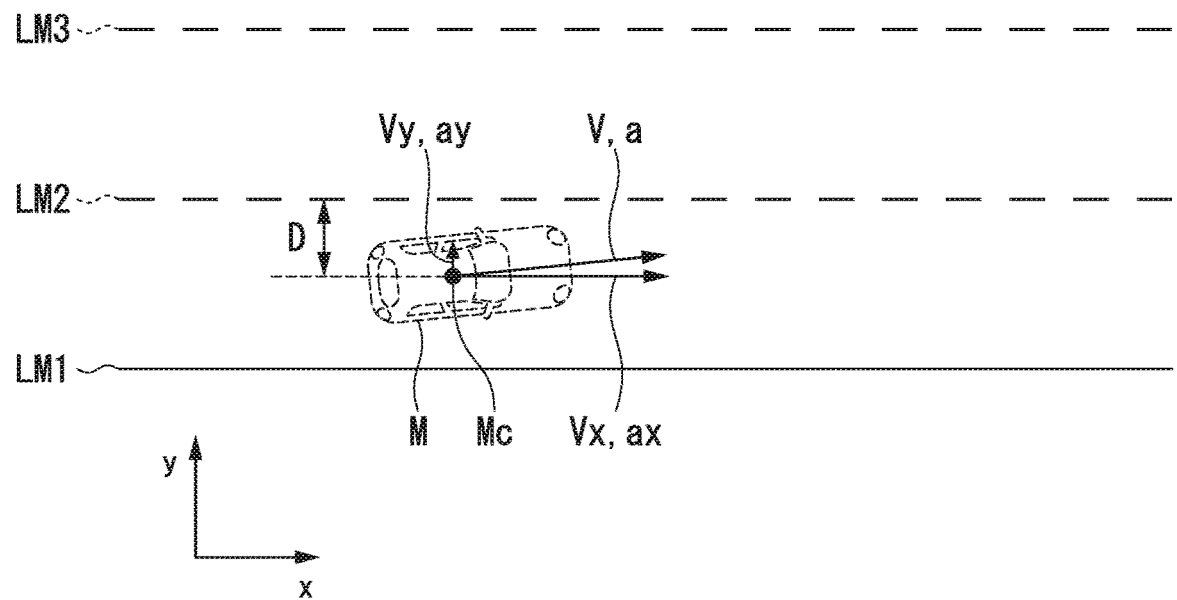
FIG. 4 is a diagram illustrating a first timing and a second timing.

The first timing, for example, in a case in which a lane change is stopped, is a timing at which a part of the vehicle body of the subject vehicle M protrudes toward the second lane when a timing at which steering control toward the center of the first lane is started is after the first timing. FIG. 4 is a diagram illustrating the first timing and the second timing. In the following description, the lane change/no-change determiner 152 executes calculation using the center of a segment connecting the center of a front-wheel vehicle axis of the subject vehicle M and the center of a rear-wheel vehicle axis as a representative point Mc of the subject vehicle M. In a coordinate system with reference to a road, a speed V and an acceleration a of the subject vehicle M are divided into a speed Vx and an acceleration ax that are components in a road extending direction and a speed Vy and an acceleration ay that are components in a road width direction. The lane change/no-change determiner 152 acquires a time-to-lane-change (TTLC) using Equation (1) with a distance between the representative point Mc of the subject vehicle M and a road partition line (LM2 illustrated in FIG. 4) on a side to which the lane change is to be made set as D and sets a timing at which the TTLC is equal to or less than a threshold Th1 as a first timing.

$$TTLC = \frac{-Vy + \sqrt{Vy^2 + 2 \cdot ay \cdot D}}{ay} \quad (ay \neq 0) \quad (1)$$

$$TTLC = D/Vy \quad (ay = 0)$$

The second timing, for example, in a case in which a lane change is stopped, is a timing at which a center part of the subject vehicle M protrudes toward the second lane when a timing at which steering control toward the center of the first lane is started is after the second timing. The lane change/no-change determiner 152 sets a timing at which the TTLC is equal to or less than a threshold Th2 as the second timing (Th1>Th2).

Figure 5:
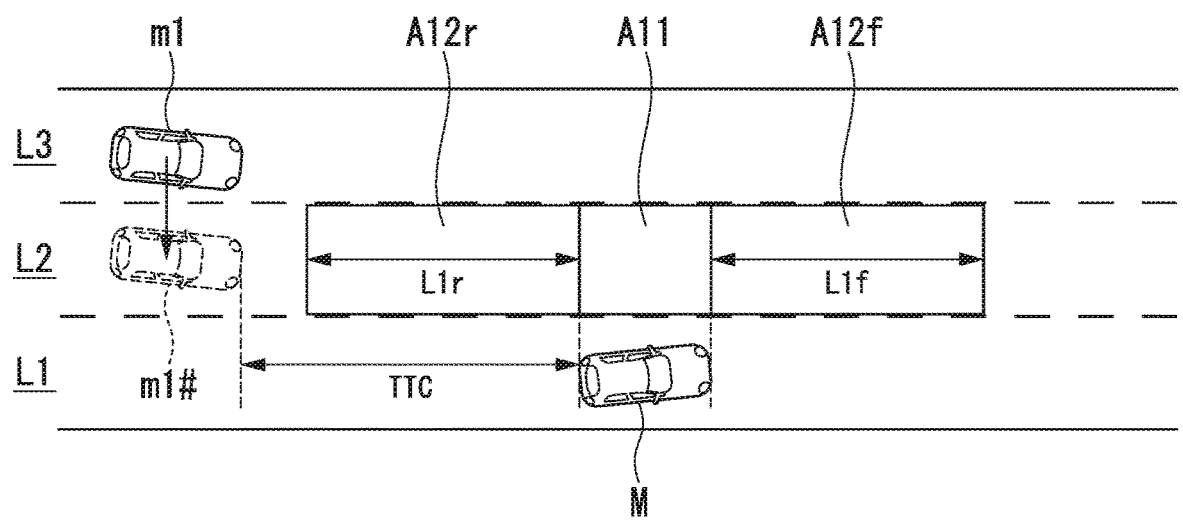
FIG. 5 is a diagram illustrating execution continuation conditions for the ALC in a first period.

FIG. 5 is a diagram illustrating execution continuation conditions for an ALC in the first period. The execution continuation conditions for the ALC in the first period, for example, include conditions that a virtual vehicle m1# acquired by projecting a vehicle m1 changing lanes from the third lane L3 to the second lane L2 onto the second lane L2 is not present in any one of areas A11, A12f, and A12r, and an index value, which is a time-to-collision between the virtual vehicle m1# and the subject vehicle M, in other words, an index value acquired by dividing the distance by a relative speed, indicating a degree of approach to the virtual vehicle m1# (or the specified other vehicle m1) is equal to or greater than a threshold Th3. In a case in which any of these is not satisfied, the lane change/no-change determiner 152 determines that the ALC is not to be continued and causes the return controller 156 to start control of the subject vehicle M. Here, the area A11 is an area acquired by projecting an area between a front end part to a back end part of the subject vehicle M onto the second lane L2. The area A12f is an area acquired by projecting an area up to a distance L1f from the front end part of the subject vehicle M onto the second lane L2. The area A12r is an area acquired by projecting an area up to a distance L1r from the back end part of the subject vehicle M onto the second lane L2. Here, the distance L1f and the distance L1r may be the same or be different from each other. When determining whether a vehicle corresponds to a specified other vehicle m1, for example, the lane change/no-change determiner 152 performs determination on the basis of a position, a speed, and the like of the other vehicle in the road width direction. The specified other vehicle m1 may be another vehicle detected as "another vehicle changing lanes from the third lane L3 to the second lane L2" first in the first period or may be another vehicle detected as "another vehicle changing lanes from the third lane L3 to the second lane L2" before the first period.

Figure 6:
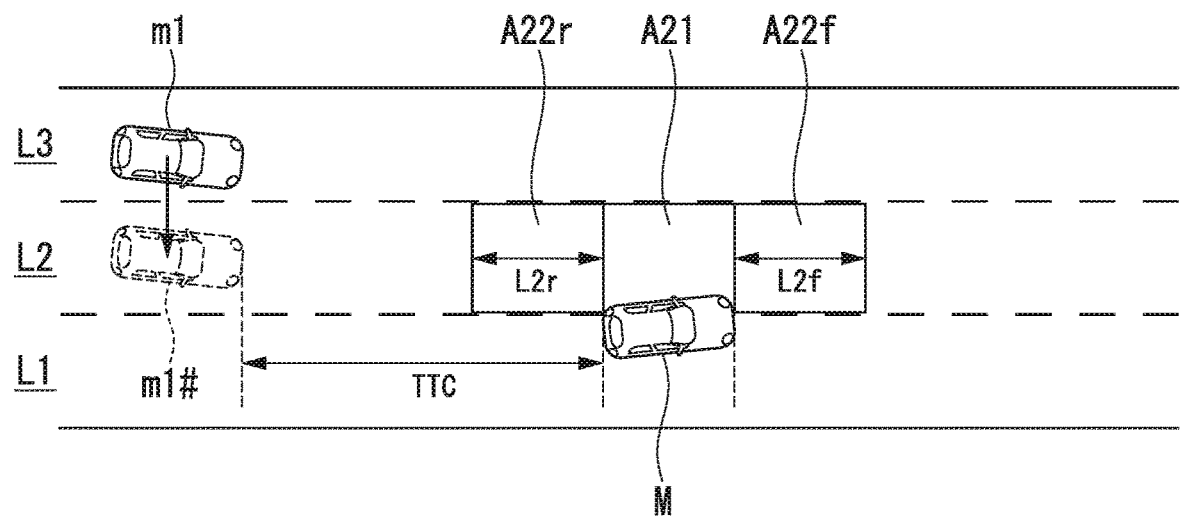
FIG. 6 is a diagram illustrating execution continuation conditions for the ALC in a second period.

FIG. 6 is a diagram illustrating execution continuation conditions for the ALC in the second period. The execution continuation conditions for the ALC in the second period, for example, include conditions that a virtual vehicle m1# is not present in any one of areas A21, A22f, and A22r, and a TTC between the virtual vehicle m1# and the subject vehicle M is equal to or greater than a threshold Th4. In a case in which any of these is not satisfied, the lane change/no-change determiner 152 determines that the ALC is not to be continued and causes the return controller 156 to start control of the subject vehicle M. Here, the area A21 is an area acquired by projecting an area between the front end part to the back end part of the subject vehicle M onto the second lane L2. The area A22f is an area acquired by projecting an area up to a distance L2f from the front end part of the subject vehicle M onto the second lane L2. The area A22r is an area acquired by projecting an area up to a distance L2r from the back end part of the subject vehicle M onto the second lane L2. Here, the distance L2f and the distance L2r may be the same or be different from each other. Here, the distance L1f>the distance L2f and the distance L1r>the distance L2r. In addition, the threshold Th3>the threshold Th4.

Figure 7:
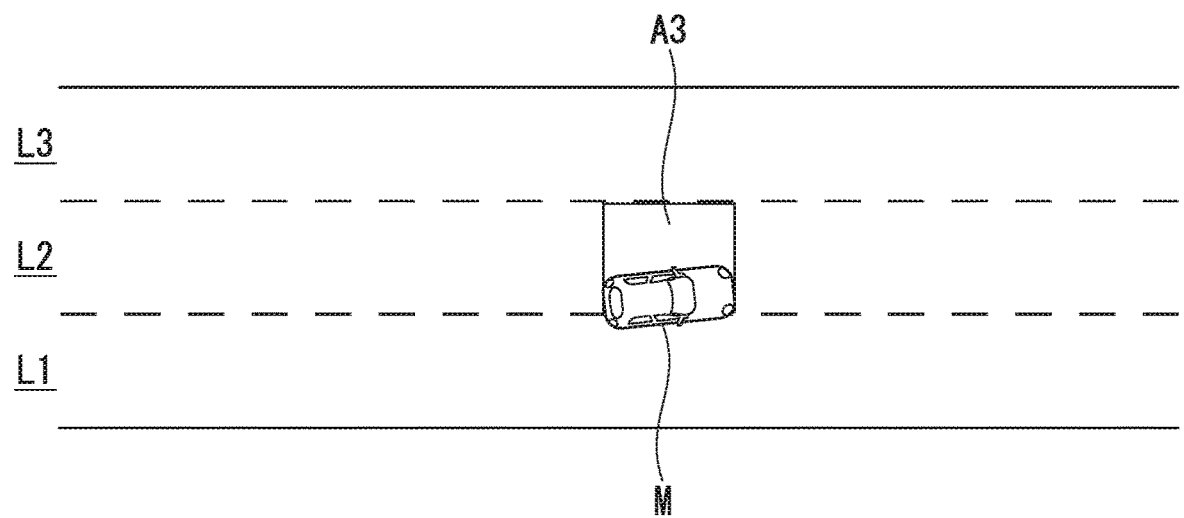
FIG. 7 is a diagram illustrating execution continuation conditions for the ALC in a third period.

FIG. 7 is a diagram illustrating execution continuation conditions for the ALC in the third period. The execution continuation conditions for the ALC in the third period, for example, include a condition that the virtual vehicle m1# is not present in an area A3. In a case in which this condition is not satisfied, the lane change/no-change determiner 152 determines that the ALC is not to be continued and causes the return controller 156 to start control of the subject vehicle M. Here, the area A3 is an area acquired by projecting the area between the front end part to the back end part of the subject vehicle M onto the second lane L2.

[Process Flow]

Figure 8:
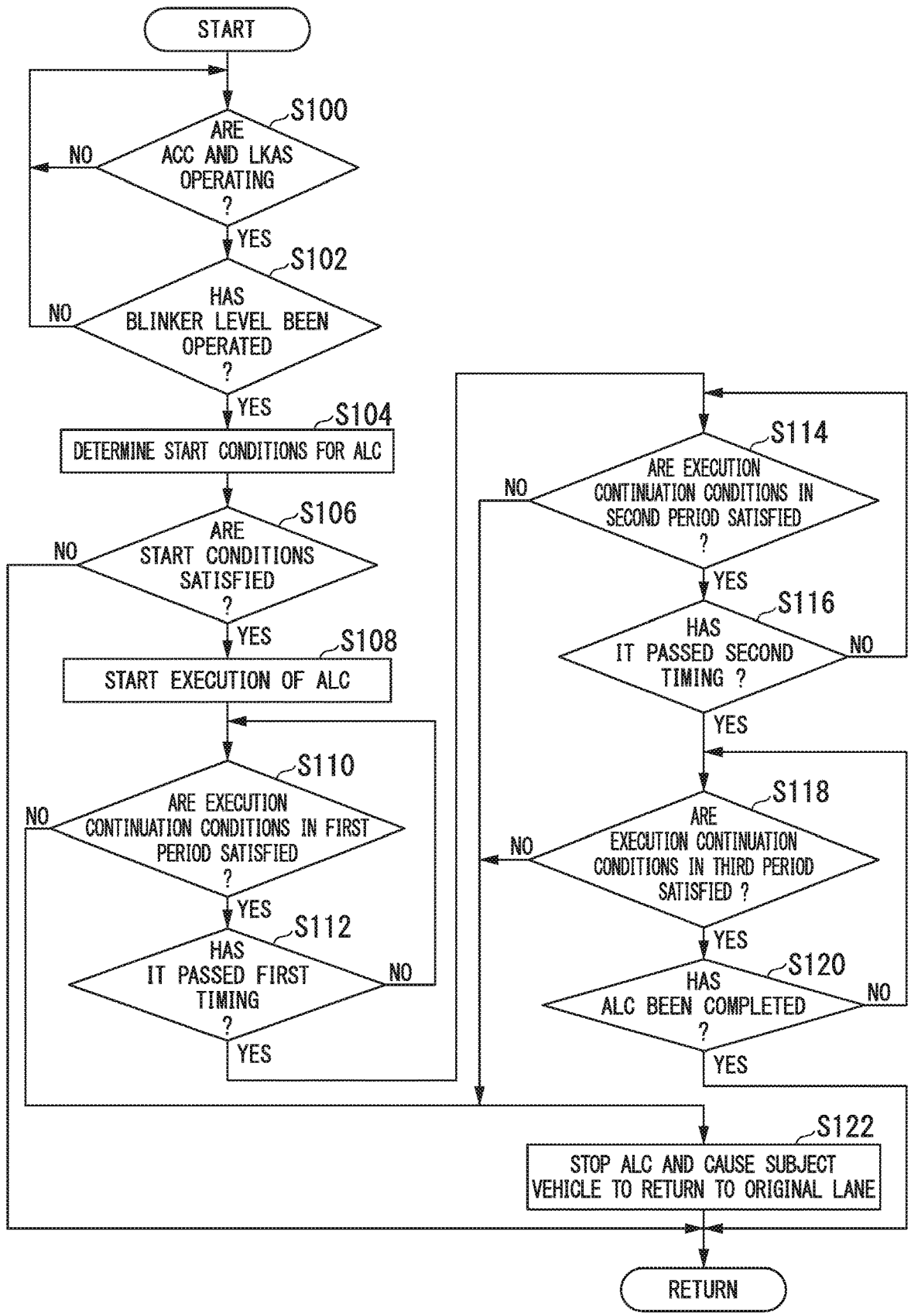
FIG. 8 is a flowchart illustrating one example of the flow of a process executed by a lane change controller 150 according to a first embodiment.

FIG. 8 is a flowchart illustrating one example of the flow of a process executed by the lane change controller 150 according to the first embodiment. First, the lane change/no-change determiner 152 determines whether or not both the ACC and the LKAS are operating (Step S100). In a case in which at least one of the ACC and the LKAS is not operating, the lane change/no-change determiner 152 waits until both the ACC and the LKAS are operating.

On the other hand, in a case in which both the ACC and the LKAS are operating, the lane change/no-change determiner 152 determines whether or not the blinker lever 54 has been operated (Step S102). In a case in which the blinker lever 54 has not been operated, the process is returned to Step S100.

On the other hand, in a case in which the blinker lever 54 has been operated, the lane change/no-change determiner 152 performs determination of start conditions for an ALC (Step S104). Then, the lane change/no-change determiner 152 determines whether or not the start conditions for an ALC are satisfied (Step S106). In a case in which it is determined that the start conditions for the ALC are not satisfied, the process of one routine of this flowchart ends.

On the other hand, in a case in which it is determined that the start conditions for the ALC are satisfied, the lane change executer 154 starts execution of the ALC (Step S108). Subsequently, the lane change/no-change determiner 152 determines whether or not the execution continuation conditions for the ALC in the first period are satisfied (Step S110). In a case in which it is determined that the execution continuation conditions for the ALC in the first period are not satisfied, the lane change executer 154 stops the execution of the ALC, and the return controller 156 returns the subject vehicle M to the original lane (Step S122).

On the other hand, in a case in which it is determined that the execution continuation conditions for the ALC in the first period are satisfied, the lane change/no-change determiner 152 determines whether or not it has passed the first timing (Step S112). In a case in which it is determined that it has not passed the first timing, the process is returned to Step S110.

On the other hand, in a case in which it is determined that it has passed the first timing, the lane change/no-change determiner 152 determines whether or not the execution continuation conditions for the ALC in the second period are satisfied (Step S114). In a case in which it is determined that the execution continuation conditions for the ALC in the second period are not satisfied, the lane change executer 154 stops the execution of the ALC, and the return controller 156 returns the subject vehicle M to the original lane (Step S122).

On the other hand, in a case in which it is determined that the execution continuation conditions for the ALC in the second period are satisfied, the lane change/no-change determiner 152 determines whether or not it has passed the second timing (Step S116). In a case in which it is determined that it has not passed the second timing, the process is returned to Step S114.

On the other hand, in a case in which it is determined that it has passed the second timing, the lane change/no-change determiner 152 determines whether or not the execution continuation conditions for the ALC in the third period are satisfied (Step S118). In a case in which it is determined that the execution continuation conditions for the ALC in the third period are not satisfied, the lane change/no-change determiner 152 determines that the ALC is not to be continued, the lane change executer 154 stops the execution of the ALC, and the return controller 156 returns the subject vehicle M to the original lane (Step S122).

On the other hand, in a case in which it is determined that the execution continuation conditions for the ALC in the third period are satisfied, the lane change executer 154 determines whether or not the ALC has been completed (Step S120). In a case in which it is determined that the ALC has not been completed, the process is returned to Step S118. On the other hand, in a case in which it is determined that the ALC has been completed, the process of one routine of this flowchart ends.

In this way, the lane change/no-change determiner 152 determines whether or not the execution of the ALC is to be continued while changing the conditions on the basis of the degree of entry of the subject vehicle M into the second lane L2. In this way, the lane change controller 150 can perform a lane change with other vehicles or a vehicle occupant taken into account (details thereof will be described later).

The execution continuation conditions for the ALC in a case in which the degree of entry is a first degree (for example, a degree of entry corresponding to the first period) are set such that it is more difficult to continue the execution than the execution continuation conditions for the ALC in a case in which the degree of entry is a second degree (for example, a degree of entry corresponding to the second period or the third period). In other words, in a case in which the specified other vehicle m1 has a predetermined positional relation with the subject vehicle M, a situation occurs in which the subject vehicle is returned to the original lane when the degree of entry is the first degree but is not returned to the original lane when the degree of entry is the second degree.

[Display Control]

Figure 9:
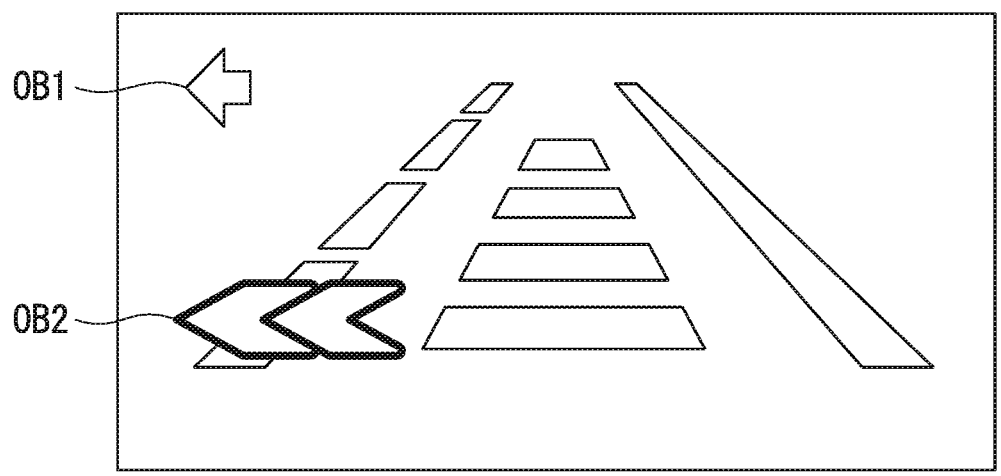
FIG. 9 is a diagram illustrating one example of an image IM1 displayed by a display device 60 in a view in which a lane change is executed by a lane change executer 154.

The display controller 160 causes the display device 60 to display an image that represents advancement of the lane change. FIG. 9 is a diagram illustrating one example of an image IM1 displayed by the display device 60 in a view in which a lane change is executed by the lane change executer 154 (in other words, the start conditions for the ALC are satisfied, and the execution continuation conditions for the ALC are satisfied). As illustrated in the drawing, in the image IM1, an object OB1 representing that a lane change is being executed, and an object OB2 representing a direction of the lane change, and the like are displayed on a background image regarded as a road.

Figure 10:
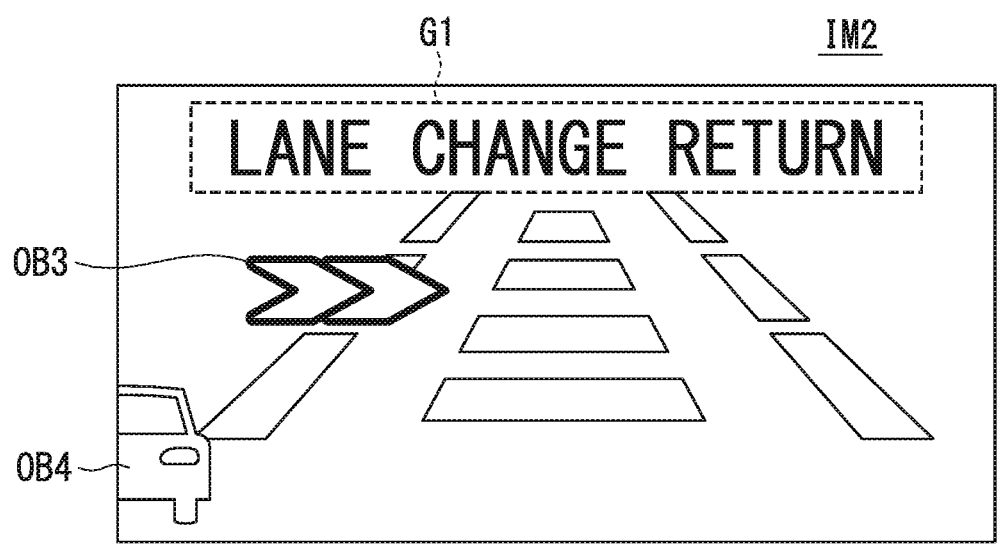
FIG. 10 is a diagram illustrating one example of an image IM2 displayed by the display device 60 in a view in which control of returning to an original lane is executed by a return controller 156.

FIG. 10 is a diagram illustrating one example of an image IM2 displayed by the display device 60 in a view in which control of returning to an original lane is executed by the return controller 156 (in other words, the execution continuation conditions for the ALC are not satisfied). As illustrated in the drawing, in the image IM2, an object OB3 representing a direction in which the subject vehicle is returned to the original lane, an object OB4 suggesting the presence of another vehicle at a lane change destination, a guide display G1 guiding returning to the original lane, and the like are displayed on a background image regarded as a road.

The vehicle control device according to the first embodiment described above includes: a detector (110 or 16) detecting other vehicles; a lane change executer (154) executing a lane change of a subject vehicle (M) on the basis of states of the other vehicles detected by the detector without depending on a steering operation of a vehicle occupant of the subject vehicle; a determiner (152) determining whether or not the lane change is to be continued on the basis of the states of the other vehicles (m1) executing a lane change from a third lane adjacent to a second lane to the second lane, which are being detected or have been detected by the detector, after start of control of executing a lane change of the subject vehicle from a first lane to the second lane adjacent to the first lane is started by the lane change executer; and a return controller (156) returning the subject vehicle from the second lane to the first lane in a case in which it is determined that the lane change is not to be continued by the determiner, whereby a lane change with another vehicle or a vehicle occupant taken into account can be performed.

For example, in a view in which a lane change has not advanced much (for example, in the first period), the vehicle control device performs control such that it is easy to return the subject vehicle to the original lane by setting execution continuation conditions for an ALC to conditions that cannot be relatively easily satisfied. On the other hand, in a view in which the lane change has advanced to some extent (for example, in the second period or the third period), the vehicle control device performs control such that it is difficult to return the subject vehicle to the original lane by setting execution continuation conditions for an ALC to conditions that can be relatively easily satisfied. In this way, in a case in which another vehicle enters a lane that is a lane change destination in an initial period of the lane change, control is performed with a tendency of yielding the way to the another vehicle, and accordingly, a lane change with other vehicles taken into account can be performed. When the subject vehicle is returned to the original lane after entering an adjacent lane much in accordance with the lane change, a vehicle occupant of the subject vehicle M is assumed to feel strange. However, in such a view, by performing control such that it is difficult for the subject vehicle to return to the original lane, the lane change with the vehicle occupant of the subject vehicle M taken into account can be performed. As a result, the vehicle control device can perform a lane change with other vehicles or a vehicle occupant taken into account.

Second Embodiment

Hereinafter, a second embodiment will be described. In a vehicle control device according to the second embodiment, details of control in a third period are different from those according to the first embodiment. When entering the third period, a lane change/no-change determiner 152 according to the second embodiment does not determine execution conditions for an ALC but causes a lane change executer 154 to execute a lane change until the ALC is completed. The reason is that, in a state in which most of the subject vehicle M has entered a second lane L2, even if there is a vehicle m1 attempting to enter the second lane L2 from a third lane L3 at a close position beside the subject vehicle M, it is assumed that the subject vehicle M has priority in a flow of natural concessions in actual traffic. Hereinafter, this difference will be focused on in description.

Figure 11:
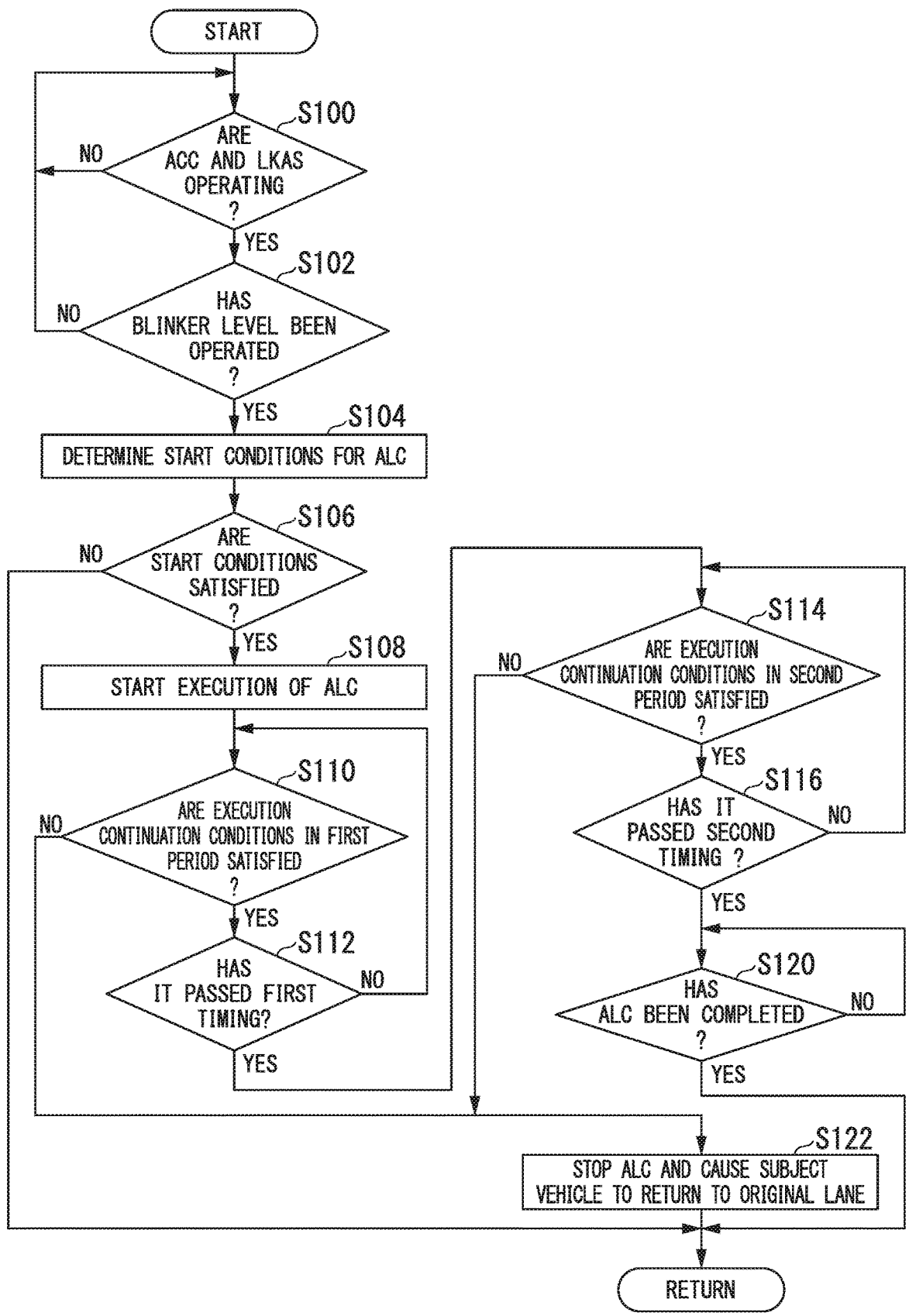
FIG. 11 is a flowchart illustrating one example of the flow of a process executed by a lane change controller 150 according to a second embodiment.

FIG. 11 is a flowchart illustrating one example of the flow of a process executed by a lane change controller 150 according to the second embodiment. Processes of Steps S100 to S116 are similar to those illustrated in the flowchart according to the first embodiment illustrated in FIG. 8, and thus, repeated description thereof will not be presented.

In Step S116, in a case in which it is determined that the it has passed a second timing, the lane change/no-change determiner 152 determines whether or not the ALC has been completed (Step S120). In a case in which it is determined that the ALC has been completed, the process of one routine of this flowchart ends.

According to the vehicle control device of the second embodiment described above, effects similar to those of the first embodiment can be acquired.

Third Embodiment

Hereinafter, a third embodiment will be described. In the first and second embodiments, it has been described that whether or not the execution of the ALC is to be continued is determined while changing the conditions on the basis of a degree of entry of the subject vehicle M into the second lane L2. A vehicle control device according to the third embodiment changes a criterion for which a subject vehicle is returned to the original lane up to a certain degree of entry on the basis of a degree of approach of a specified other vehicle m1 to the subject vehicle M. In the third embodiment, although purposes and results of the control are similar to those according to the first or second embodiment, the processing sequence is different from that according to the first or second embodiment. For example, a lane change/no-change determiner 152, first, calculates an index representing a degree of approach of a specified other vehicle m1, determines a degree of entry up to which the subject vehicle is returned to the original lane on the basis of the index value, and determines whether or not the subject vehicle is returned to the original lane on the basis of an actual degree of entry.

Figure 12:
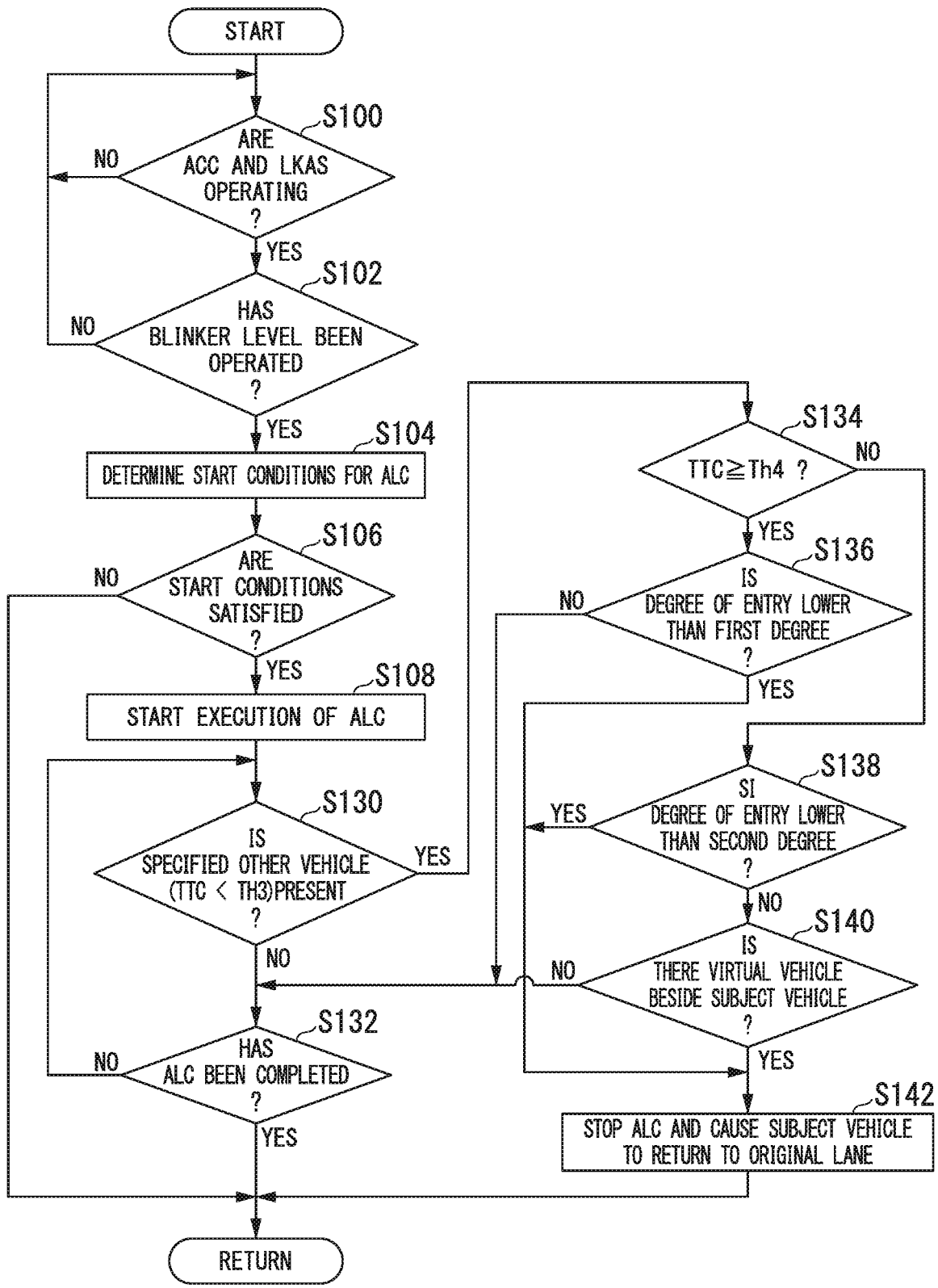
FIG. 12 is a flowchart illustrating one example of the flow of a process executed by a lane change controller 150 according to a third embodiment.

FIG. 12 is a flowchart illustrating one example of the flow of a process executed by a lane change controller 150 according to the third embodiment. Processes of Steps S100 to S108 are similar to those illustrated in the flowchart illustrated in FIG. 8 or 11, and thus, repeated description thereof will not be presented.

When execution of an ALC is started, the lane change/no-change determiner 152 determines whether or not a specified other vehicle m1 is present (Step S130). Here, the specified other vehicle m1 is another vehicle determined to change lanes to a second lane L2 and has a TTC with the subject vehicle, which is less than a threshold T3. In a case in which the specified other vehicle m1 is not present, a lane change executer 154 determines whether or not the ALC has been completed (Step S132). In a case in which it is determined that the ALC has not been completed, the process is returned to Step S130. On the other hand, in a case in which it is determined that the ALC has been completed, the process of one routine of this flowchart ends.

On the other hand, in a case in which it is determined that the specified other vehicle m1 is present, the lane change/no-change determiner 152 determines whether or not a TTC between the specified other vehicle m1 and the subject vehicle M is equal to or greater than a threshold Th4 (Step S134).

In a case in which the TTC between the specified other vehicle m1 and the subject vehicle M is equal to or greater than the threshold Th4, the lane change/no-change determiner 152 determines whether or not a degree of entry of the subject vehicle M into a second lane L2 is less than a first degree (Step S136). Here, the first degree, for example, represents a degree of entry up to the first timing described in the first embodiment. In a case in which the degree of entry of the subject vehicle M into the second lane L2 is less than the first degree, the lane change/no-change determiner 152 determines not to continue the ALC, a lane change executer 154 stops the execution of the ALC, and a return controller 156 returns the subject vehicle M to the original lane (Step S142). On the other hand, in a case in which a degree of entry of the subject vehicle M into the second lane L2 is equal to or greater than the first degree, the process is returned to Step S132.

On the other hand, in a case in which the TTC between the specified other vehicle m1 and the subject vehicle M is smaller than the threshold Th4, the lane change/no-change determiner 152 determines whether or not the degree of entry of the subject vehicle M into the second lane L2 is smaller than a second degree (Step S138). Here, for example, the second degree represents a degree of entry up to the second timing described in the first embodiment. In a case in which the degree of entry of the subject vehicle M into the second lane L2 is smaller than the second degree, the lane change/no-change determiner 152 determines that the ALC is not to be continued, the lane change executer 154 stops the execution of the ALC, and the return controller 156 returns the subject vehicle M to the original lane (Step S142).

On the other hand, in a case in which the degree of entry of the subject vehicle M into the second lane L2 is equal to or greater than the second degree, the lane change/no-change determiner 152 determines whether or not a virtual vehicle acquired by projecting the specified other vehicle m1 onto the second lane L2 is present beside the subject vehicle M (for example, an area A3 represented in FIG. 7) (Step S140). In a case in which the virtual vehicle is present beside the subject vehicle M, the lane change/no-change determiner 152 determines that the ALC is not to be continued, the lane change executer 154 stops the execution of the ALC, and the return controller 156 returns the subject vehicle M to the original lane (Step S142). On the other hand, in a case in which the virtual vehicle is not present beside the subject vehicle M, the process is returned to Step S132.

According to the vehicle control device according to the third embodiment described above, effects similar to those of the first embodiment can be acquired.

In addition, in the third embodiment, the criterion of determination for the degree of entry of the subject vehicle M into the second lane L2 may be configured to be able to be set by a vehicle occupant.

<Others>

In each of the embodiments described above, while the calculation has been described as being executed using the center of the segment connecting the center of the front-wheel vehicle axis and the center of the rear-wheel vehicle axis of the subject vehicle M as the representative point Mc of the subject vehicle M, the calculation is not limited thereto, and the calculation may be executed using a different position on the subject vehicle M as a representative point. The number of representative points does not need to be one. For example, as a point that becomes a criterion for "a part of the vehicle body of the subject vehicle M protruding toward the second lane L2" that is a criterion for the first timing or the first degree, a front end part on the side to which the lane change is made may be set as a representative point. As a point that becomes a criterion for "the entire vehicle body of the subject vehicle M entering the second lane L2", a rear end part on a side opposite to the side to which the lane is changed may be set as a representative point.

In a case in which a situation in which it is difficult to continue the lane change and return the subject vehicle to the original lane occurs during the execution of the ALC, the vehicle control device, for example, may perform control of switching to manual driving after causing the subject vehicle M to run in parallel with a lane for a predetermined time.

The vehicle control device may be applied also to an automatic driving vehicle automatically executing a lane change, branching, merging, right/left turning, and the like. In this case, in a case in which a lane change is executed for running along the path to a destination, a lane change is executed for overtaking, and in other cases, the vehicle control device performs control similar to that according to the embodiment described above. In this case, the operating of the ACC and the LKAS may not be included in the start conditions for the lane change.

Figure 13:
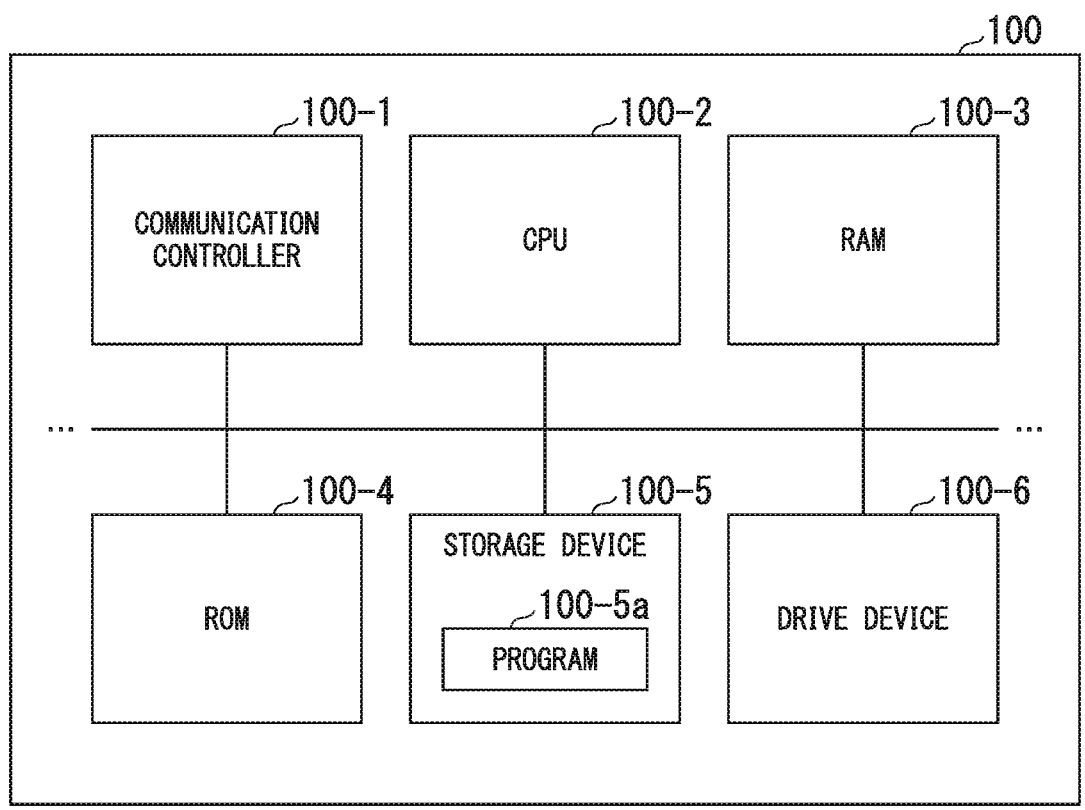
FIG. 13 is a diagram illustrating one example of the hardware configuration of a driver assistance controller 100 (or a vehicle control device applied to an automatic driving vehicle).

FIG. 13 is a diagram illustrating one example of the hardware configuration of the driver assistance controller 100 (or a vehicle control device applied to an automatic driving vehicle). As illustrated in the drawing, the driver assistance controller 100 and the like have a configuration in which a communication controller 100-1, a CPU 100-2, a random access memory (RAM) 100-3 used as a working memory, a read only memory (ROM) 100-4 storing a boot program and the like, a storage device 100-5 such as a flash memory or a hard disk drive (HDD), a drive device 100-6, and the like are interconnected through an internal bus or a dedicated communication line. The communication controller 100-1 communicates with other constituent elements in the driver assistance controller 100. A program 100-5a executed by the CPU 100-2 is stored in the storage device 100-5. This program is loaded into the RAM 100-3 by a direct memory access (DMA) controller (not illustrated in the drawing) and the like and is executed by the CPU 100-2. In this way, some or all of the constituent elements of the driver assistance controller 100 are realized.

The embodiment described above can be represented as below.

A vehicle control device that includes a storage device storing a program and a hardware processor, and, by executing the program stored in the storage device using the hardware processor, is configured to perform a lane change of a vehicle on the basis of detected states of other vehicles without depending on a steering operation of a vehicle occupant of the subject vehicle, after control of changing lanes of the subject vehicle from a first lane to a second lane adjacent to the first lane is started, determine whether or not the lane change is to be continued on the basis of the states of the other vehicles changing lanes from a third lane adjacent to the second lane to the second lane, which are being detected or have been detected, and return the subject vehicle from the second lane to the first lane in a case in which it is determined that the lane change is not to be continued.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising a processor, the processor being configured to:

detect other vehicles;

execute a lane change of a subject vehicle based on states of the other vehicles without depending on a steering operation of a vehicle occupant of the subject vehicle;

determine whether or not the lane change is to be continued based on the states of a first vehicle, the first vehicle being one of the other vehicles executing a lane change from a third lane adjacent to a second lane to the second lane, which are being detected or have been detected, after control of executing the lane change of the subject vehicle from a first lane to the second lane adjacent to the first lane is started; and return the subject vehicle from the second lane to the first lane in a case in which it is determined that the lane change is not to be continued, wherein the processor determines whether or not the lane change is to be continued based on a time for the subject vehicle to arrive at the second lane, wherein, in a case in which the first vehicle has a predetermined positional relation with the subject vehicle, the processor determines that the lane change is to be continued in a case in which the time is shorter than a threshold value and determines that the lane change is not to be continued in a case in which the time is longer than the threshold value, and wherein, the processor changes the threshold value based on an index value obtained by dividing a distance by a relative speed between the first vehicle and the subject vehicle.

2. The vehicle control device according to claim 1, wherein the processor determines that the lane change is not to be continued regardless of the degree of entry in a case in which the first vehicle has entered a predetermined area on a lateral side of the subject vehicle.

3. The vehicle control device according to claim 1, wherein the threshold value is able to be changed by a vehicle occupant.

4. The vehicle control device according to claim 1, wherein the processor determines whether or not the lane change is to be continued based on the index value.

5. The vehicle control device according to claim 1, wherein the processor changes conditions for determining whether or not the lane change is to be continued based on the degree of entry of the subject vehicle into the second lane.

6. A vehicle control method executed using a computer mounted in a vehicle, the vehicle control method comprising:

detecting other vehicles;

executing a lane change of a subject vehicle based on states of the other vehicles without depending on a steering operation of a vehicle occupant of the subject vehicle;

determining whether or not the lane change is to be continued based on the states of a first vehicle, the first vehicle being one of the other vehicles executing a lane change from a third lane adjacent to a second lane to the second lane after control of executing the lane change of the subject vehicle from a first lane to the second lane adjacent to the first lane is started; and returning the subject vehicle from the second lane to the first lane in a case in which it is determined that the lane change is not to be continued, wherein the determination is performed based on a time for the subject vehicle to arrive at the second lane, wherein, in a case in which the first vehicle has a predetermined positional relation with the subject vehicle, the determination includes determining that the lane change is to be continued in a case in which the time is shorter than a threshold value and determining that the lane change is not to be continued in a case in which the time is longer than the threshold value, and wherein, the method further comprises changing the threshold value based on an index value obtained by dividing a distance by a relative speed between the first vehicle and the subject vehicle.

7. A computer-readable non-transitory storage medium storing a program, the program causing a computer to execute:

detecting other vehicles;

executing a lane change of a subject vehicle based on states of the other vehicles without depending on a steering operation of a vehicle occupant of the subject vehicle;

determining whether or not the lane change is to be continued based on the states of a first vehicle, the first vehicle being one of the other vehicles executing a lane change from a third lane adjacent to a second lane to the second lane after control of executing the lane change of the subject vehicle from a first lane to the second lane adjacent to the first lane is started; and returning the subject vehicle from the second lane to the first lane in a case in which it is determined that the lane change is not to be continued, wherein the determination is performed based on a time for the subject vehicle to arrive at the second lane, wherein, in a case in which the first vehicle has a predetermined positional relation with the subject vehicle, the determination includes determining that the lane change is to be continued in a case in which the time is shorter than a threshold value and determining that the lane change is not to be continued in a case in which the time is longer than the threshold value, and wherein, the method further comprises changing the threshold value based on an index value obtained by dividing a distance by a relative speed between the first vehicle and the subject vehicle.

* * * * *